United States Patent Office.

ALFRED PARAF, OF NEW YORK, N. Y., ASSIGNOR TO EDWARD SABINE RENWICK, TRUSTEE.

Letters Patent No. 95,039, dated September 21, 1869.

IMPROVED EXTRACT OF MADDER FOR DYEING AND PRINTING

The Schedule referred to in these Letters Patent and making part of the same.

*To all whom it may concern:*

Be it known that I, ALFRED PARAF, of France, at present a resident in the city, county, and State of New York, have made an invention or discovery of a new and useful article of manufacture, which I denominate Paraf's Compound Extract of Madder; and that the following is a full, clear, and exact description and specification of the same.

The object of this invention is to enable a bright madder color to be printed upon cloths; and My new article of manufacture consists in the composition of the coloring matter of madder, with such a chemical compound, of an alkaline base and a volatile acid, as will decompose after the compound extract is printed upon cloth, and permit the alkaline base to develop or to brighten the color of the madder.

The form in which I prefer to use the coloring matter of madder for manufacturing my new compound extract is that called tinctorine, because it is practically free from pectic acid and copper.

The compounds, of an alkaline base and a volatile acid, which I have used with success in manufacturing my said compound extract, are the acetate of soda, the acetate of potash, and the acetate of lime, one or more of which may be used, as found expedient.

The proportions in which the ingredients are compounded may be varied, as found expedient by the user.

In order that users may be able to manufacture my new composition with success, I will give several recipes for the same.

No. 1, compound extract of madder for printing red:
Tinctorine, forty pounds.
Liquid acetic acid, at 10° Twaddle, one hundred pounds.
Rancid olive-oil, ten pounds.
Starch, twenty-two pounds.
Solution of acetate of lime, at 16° Twaddle, ten pounds.
Solution of acetate alumina, at 16° Twaddle, fifteen pounds.

No. 2, compound extract of madder for printing purple:
Tinctorine, forty pounds.
Liquid acetic acid, at 10° Twaddle, one hundred pounds.
Rancid olive-oil, ten pounds.
Starch, twenty-two pounds.
Solution of acetate of lime, at 16° Twaddle, ten pounds.
Solution of acetate of iron, at 10° Twaddle, ten pounds.

The mode of preparing the above extracts which I prefer is to mix together all the ingredients except the acetates, to boil the mixture until the starch is dissolved, then to permit it to cool, after which the acetates are stirred into it until the whole is thoroughly mixed.

For printing chocolate, the above extracts may be mixed in equal or other proportions, to suit the particular shade required.

The acetate of lime in the said compounds may be replaced by the same quantity of a solution of the same specific gravity of either the following acetates, viz, the acetate of soda, and the acetate of potash, or by the same quantity of a mixture of two of these solutions.

The quantity of starch may be varied, as found expedient, according to the consistency required in the compound; and instead of adding the acetate of the alkaline base after the tinctorine has been boiled with the acetic acid and starch, the tinctorine or other extract of madder used and the alkaline acetate may be mixed together, and afterward incorporated with a compound of the acetic acid, of the starch, and of the oil, after which the acetate of alumina or acetate of iron may be incorporated in the mixture.

As my invention or discovery consists of the composition of the coloring matter of madder with the chemical compound of the alkaline base and volatile acid, it is produced whether the coloring-matter be mixed with other ingredients or not, previous to compounding it with the said compound, and whether the composition consists of the coloring matter of madder and said chemical compound, with or without other ingredients.

I claim as my invention and desire to secure by Letters Patent—

The before-described compound extract of madder, being a composition of the coloring matter of madder and the compound of the alkaline base and volatile acid, substantially as before described, the same being a new article of manufacture.

In testimony whereof I have hereto set my hand this 23d day of August, A. D. 1869.

ALFRED PARAF.

Witnesses:
E. S. RENWICK,
W. L. BENNEM.